(12) United States Patent
Zoellner

(10) Patent No.: US 6,338,303 B1
(45) Date of Patent: Jan. 15, 2002

(54) PERFORATED BOTTOM PLATE FOR THE PRODUCTION OF A FLUIDIZED BED

(76) Inventor: Jobst O. A. Zoellner, An'n Slagboom 30, 22848 Norderstedt (DE)

( * ) Notice: Subject to any disclaimer, the term of this patent is extended or adjusted under 35 U.S.C. 154(b) by 0 days.

(21) Appl. No.: 09/427,975

(22) Filed: Oct. 27, 1999

(30) Foreign Application Priority Data

Nov. 2, 1998 (DE) .......................... 198 50 332

(51) Int. Cl.$^7$ .................................................. F23G 5/00
(52) U.S. Cl. ..................................... 110/243; 110/244
(58) Field of Search ........................... 432/238; 99/483, 99/476; 34/60, 68, 233; 110/243, 244, 245

(56) References Cited

U.S. PATENT DOCUMENTS

| | | | |
|---|---|---|---|
| 2,975,037 A | | 3/1961 | Lake |
| 4,063,532 A | * | 12/1977 | Steffen ........................ 34/54 |
| 4,171,945 A | * | 10/1979 | Lazenby ..................... 431/170 |
| 4,300,458 A | * | 11/1981 | Comparato et al. ......... 110/263 |
| 4,426,936 A | * | 1/1984 | Kuo ........................... 110/245 |
| 4,444,553 A | * | 4/1984 | Christodoulou ............... 432/15 |
| 4,476,790 A | * | 10/1984 | Borio et al. ................ 110/245 |
| 4,501,761 A | * | 2/1985 | Mahlmann et al. ......... 426/467 |
| 4,892,030 A | * | 1/1990 | Grieve ............................. 98/1 |
| 4,931,259 A | * | 6/1990 | Okatomo et al. ........... 422/143 |
| 5,014,632 A | * | 5/1991 | Isaksson ..................... 110/347 |
| 5,097,753 A | * | 3/1992 | Naft ............................. 99/341 |
| 5,097,755 A | | 3/1992 | Hill ............................. 99/484 |
| 5,148,687 A | * | 9/1992 | Tamei et al. ................. 62/266 |
| 5,579,679 A | * | 12/1996 | Hsu ............................. 99/339 |
| 5,580,591 A | * | 12/1996 | Cooley et al. .................. 426/8 |

FOREIGN PATENT DOCUMENTS

| | | |
|---|---|---|
| EP | 0 320 282 | 6/1989 |
| EP | 0 474 949 | 3/1992 |
| GB | 1 376 916 | 12/1974 |
| JP | 64-49817 | 2/1989 |
| JP | 7-265683 | 10/1995 |

* cited by examiner

*Primary Examiner*—Henry Bennett
*Assistant Examiner*—K. B. Rinehart
(74) *Attorney, Agent, or Firm*—Howson and Howson

(57) ABSTRACT

A perforated bottom plate for the production of a fluidized bed within a container. The perforated bottom plate has a large number of holes through which a gaseous medium flows in order to produce the fluidized bed. For better mixing of the granular material in the fluidized bed, the perforated bottom plate is provided with evenly distributed areas in which, compared to a uniform perforation, a greater number of holes per unit of area is provided.

3 Claims, 2 Drawing Sheets

PERFORATED BOTTOM PLATE FOR THE PRODUCTION OF A FLUIDIZED BED

FIELD OF THE INVENTION

The invention relates to a perforated bottom plate for the production of a fluidized bed within a container, and more particularly, a perforated bottom plate having a large number of holes through which gaseous medium flows in order to produce the fluidized bed.

BACKGROUND OF THE INVENTION

It is known that a fluidized bed can be produced within a container to increase heat transfer or to attain a more efficient use of a granular fuel. In particular, in such a procedure the container has a perforated bottom plate that contains a large number of through-holes, through which the fluidizing agent flows. This agent can, for example, be air for combustion. It can also be cooling or heating air, or serve merely for the production of a fluidized bed.

In the thermal treatment of granular material, for example, in roasting of coffee or peanuts, it is necessary for the material to come into uniform contact with the heating and/or cooling gases and/or a humidifying agent. For this reason the known procedure for achieving this type of roasting is in a continuous fluidized bed. It has been shown that, although a fluidized bed can be produced with conventional perforated bottom plates which exhibit a regular perforation pattern, breaks develop in the fluidized layer and a satisfactory uniform mixing of the granular material is not ensured.

OBJECT OF THE INVENTION

The basic purpose of the invention is to design a perforated bottom plate of the type described above in such a way that a thorough mixing of the granular material that forms the fluidized bed is achieved.

SUMMARY OF THE INVENTION

This purpose is achieved, according to the invention, in a perforated bottom plate that exhibits essentially evenly distributed areas that contain, a greater number of holes per unit of area compared to a regular perforation pattern. Alternately, or in addition, the design can specify that the perforated bottom plate exhibits essentially evenly distributed areas that contain a lesser number of holes per unit of area compared to a regular perforation pattern. Surprisingly, it has been shown that when such areas contain more or fewer holes per unit of area than in the rest of the perforated bottom plate, a more thorough mixing of the fluidized bed results.

In particular, there are areas in which more of the gaseous medium flows through the granular material, such that the desired mixing is achieved through the formation of a "spouting bed." An ideal fluidized bed is in fact formed with localized "spouts" that ensure a thorough and uniform mixing of the material. Thorough and uniform contact between the material and the gaseous medium is achieved, such that, for example, a roasting process can be carried out at a lower temperature and in a shorter amount of time. In this way a delicate material to be roasted is treated gently.

According to a preferred embodiment of the invention, it is provided that the areas with a greater or lesser number of perforations are distributed symmetrically on the perforated bottom plate. This prevents the formation of areas that form under otherwise evenly distributed gas flow, in which only a lesser degree of mixing of the granular material takes place. In this way, the uniformity of the thermal treatment is assured.

The design of these areas with a greater or lesser number of holes is basically arbitrary. It can be useful if they are essentially circular in shape. These circular areas can, for example, be arranged on the perforated bottom plate evenly distributed with constant spacing intervals.

The thorough mixing effected through such a perforated bottom plate is achieved primarily due to the increased flow of the fluidizing agent in the areas containing a greater number of holes per unit of area. According to the invention, it is further intended that in each case the areas with a greater number of holes be larger than the areas with a lesser number of holes. This prevents the formation on the perforated bottom plate of dead spaces in which no fluidized bed, or only a minimal one, is produced.

The shape of the holes is basically arbitrary. It is only necessary that the holes be smaller than a single particle of the granular material to be processed. This prevents the material from falling through the holes. The holes can be essentially equal in size and circular or elongated in shape. The elongated shape of such holes has the advantage that the granular material cannot easily become lodged, and particles that become lodged can be easily removed. As long as there is a certain degree of uniformity, it is not necessary that the holes be arranged on the perforated bottom plate in a rigorously symmetrical distribution.

It has been shown that an excellently mixed fluidized bed can be produced with this type of perforated bottom plate. A container fitted with this type of perforated bottom plate is therefore particularly suitable for the uniform thermal treatment of relatively delicate material, for example, in the roasting of coffee and/or peanuts. Other goods can also be treated in this way. It is also possible to use this type of perforated bottom plate in the burning of granular fuels, for example, lignite. This perforated bottom plate can additionally be used in batch processing as well as used continuously or semi-continuously.

The perforated bottom plate may be implemented in a container used in the semi-continuous roasting of coffee and/or peanuts, as described by the applicant in the German Utility Model No. 298 10 911.5. In particular, it is possible to provide even small roasting facilities with a roaster equipped with this type of sieve plate. In this way, it would also be possible to economically roast smaller amounts of material in a fluidized bed.

It has further been shown that this model of sieve plate is also suited for the drying of material. A dryer for fresh coffee beans, for example, can be equipped with this type of sieve plate. The drying process can be accelerated and can take place on location at a plantation, such that, for example, the growth of mold can be prevented.

BRIEF DESCRIPTION OF THE DRAWINGS

The invention is described in greater detail below with reference to the drawings. They show.

and

Figure 2:
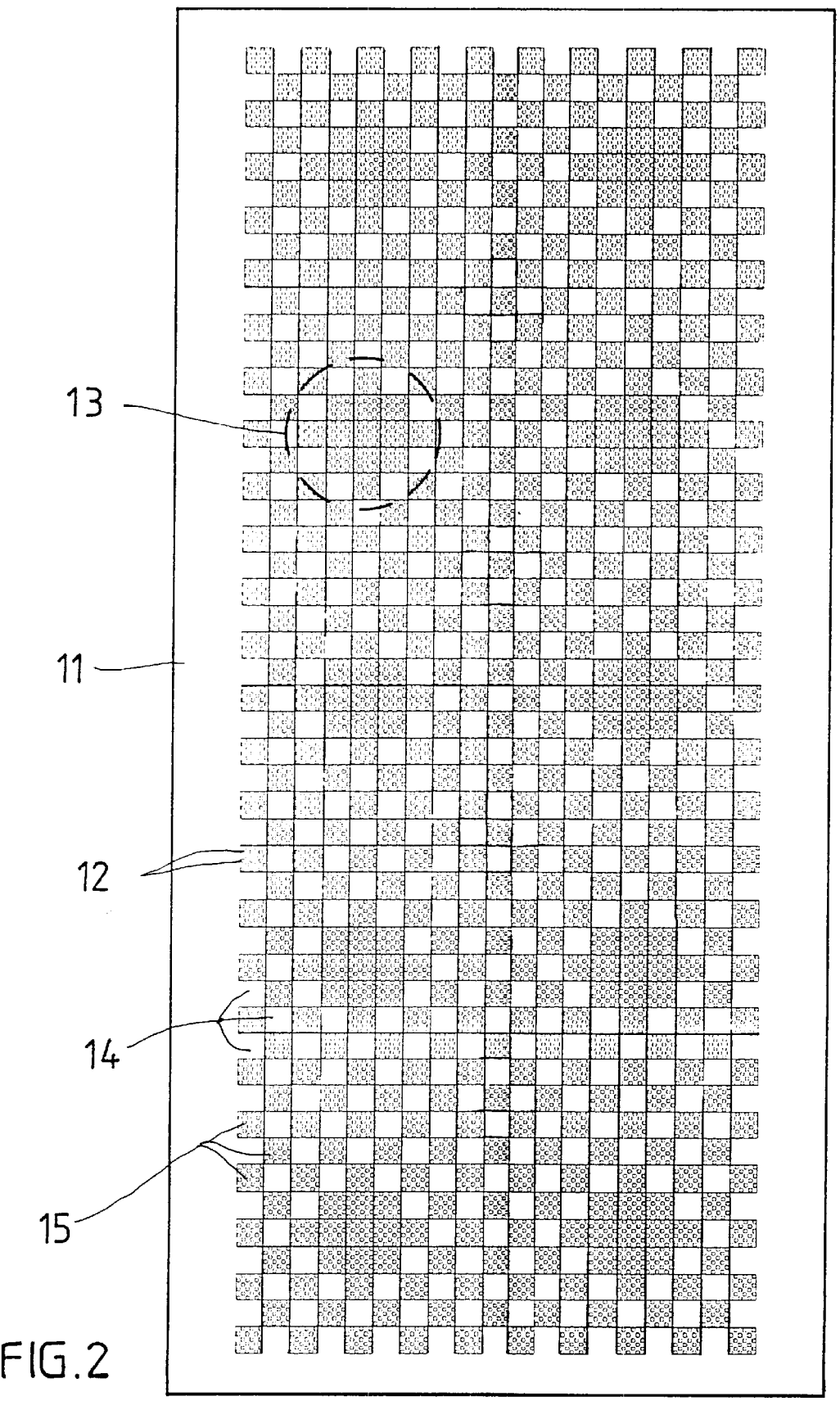

FIG. 2 is a top view of a perforated bottom plate according to another embodiment of the invention.

DETAILED DESCRIPTION OF THE PREFERRED EMBODIMENTS

Figure 1:
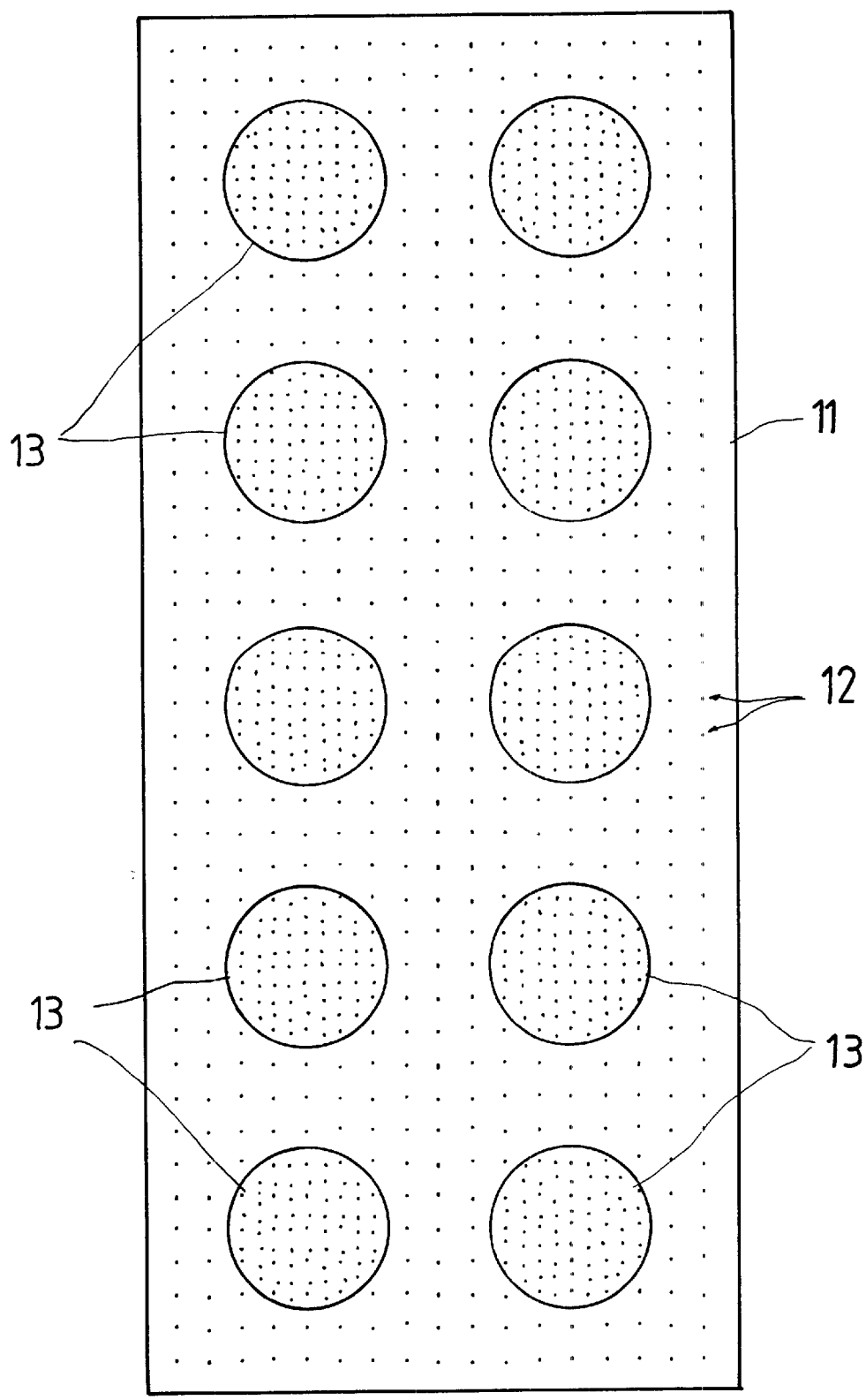
FIG. 1 is a top view of a perforated bottom plate according to the invention.

The perforated bottom plate 11 shown in FIG. 1 exhibits a large number of holes 12, which are distributed in a regular grid pattern on the perforated bottom plate. The holes all have the same internal dimensions and exhibit the same inner contours. In particular, the arrangement is such that there are areas 13, in which a greater number of holes are present, compared to a uniform distribution of holes per unit of area. The areas are essentially distributed uniformly over the surface of the sieve plate. The areas with a greater or lesser number of holes make up approximately 10–25% of the total surface area.

In FIG. 2 the perforated bottom plate forms a grid. There are sections like 14 that have no holes. Furthermore, sections like 15 are provided that have a predetermined number of holes. Sections like 15 all display the same perforation. Sections 14, 15 are preferably of the same size and, in the example model shown in the drawing, are square in form. Sections 14, 15 are evenly distributed and arranged in a checkerboard pattern over the perforated bottom plate such that a uniform distribution of holes per unit of area results.

The areas 13 with a greater number of holes 12 are formed by grouping together the sections 15 with holes to form larger sections of the surface. It is possible to provide areas with a greater number of holes on perforated bottom plates with a uniform distribution of holes by creating additional holes in those areas. It is also possible to provide a perforated bottom plate with areas with a lesser number of holes than in the underlying uniform distribution. These possibilities are depicted in the drawing.

Providing such areas containing a greater number of holes per unit of area has the result that in these areas the flow of the gaseous medium for producing the fluidized bed is increased. This then has the result that the granular material can be more effectively mixed across the perforated bottom plate. The granular material is uniformly brought into contact with the gaseous medium.

The particulars of how the areas with the greater or lesser number of holes per unit of area are designed and how far apart they are depends, among other things, on the nature of the material that is to be processed. The areas can be round, square, or rectangular in shape. The distance between two such areas essentially equals to or is greater than their outside dimensions. The number of holes in the areas with greater numbers can be 1.5–3 times the number of holes in the rest of the perforated bottom plate that has uniform perforations. The number of holes in the areas with lesser numbers can be approximately 0.25–0.75 times the number of holes in the rest of the perforated bottom plate. This stated distribution achieves good circulation in the fluidized bed.

What is claimed is:

1. A bottom plate for the production of a fluidized bed within a container, comprising a perforated bottom plate having a large number of holes through which gaseous medium flows in order to produce the fluidized bed, said perforated bottom plate (11) having a plurality of separate spaced-apart areas (13) which are distributed essentially uniformly over the perforated bottom plate and in which a greater number of holes (12) per unit of area are provided in comparison to adjacent areas of said perforated bottom plate where a uniform distribution of holes per unit of area is provided, wherein said perforated bottom plate (11) is made from a plurality of sections (14,15) which are laid out in a grid pattern to form said perforated bottom plate (11), wherein said plurality of sections include a plurality of identical perforated sections (15) through which gaseous medium flows to produce the fluidized bed and a plurality of identical non-perforated sections (14), and wherein said plurality of areas (13) having a greater number of holes per unit of area are formed by grouping together in an adjacent relationship several of said perforated sections (15).

2. A bottom plate for the production of a fluidized bed within a container, comprising a perforated bottom plate having a large number of holes through which gaseous medium flows to form the fluidized bed, said perforated bottom plate having a plurality of separate spaced-apart areas which are distributed essentially uniformly over the perforated bottom plate and in which a lesser number of holes per unit of area is provided in comparison to adjacent areas of said perforated bottom plate where a uniform distribution of holes per unit of area is provided, wherein said perforated bottom plate has a plurality of separate spaced-apart areas with a greater number of holes per unit area, wherein said perforated bottom plate (11) is made from a plurality of sections (14,15) which are laid out in a grid pattern to form said perforated bottom plate (1), wherein said plurality of sections include a plurality of identical perforated sections (15) through which gaseous medium flows to produce the fluidized bed and a plurality of identical non-perforated sections (14), and wherein said plurality of areas having a greater number of holes per unit of area are formed by grouping together in an adjacent relationship several of said perforated sections (15).

3. A bottom plate according to claim 2, wherein said areas with a greater number of holes have a number of holes which is approximately 1.5 to 3 times the number of holes in the rest of the perforated bottom plate.

* * * * *